United States Patent [19]

Shinoda et al.

[11] 4,087,707
[45] May 2, 1978

[54] HEATED AIR DISSIPATING DEVICE FOR MOTOR USE IN A BATTERY-POWERED FORKLIFT TRUCK

[75] Inventors: Akibumi Shinoda, Handa; Masahiko Shimizu, Obu, both of Japan

[73] Assignee: Kabushiki Kaisha Toyoda Jidoshokki Seisakusho, Japan

[21] Appl. No.: 727,166

[22] Filed: Sep. 24, 1976

[30] Foreign Application Priority Data

Sep. 27, 1975 Japan .................... 50-116876

[51] Int. Cl.² ............................................. H02K 9/06
[52] U.S. Cl. ........................................... 310/63; 310/89
[58] Field of Search .................. 310/60, 62, 63, 64, 310/65, 57, 58, 52, 59, 89, 66, 91

[56] References Cited
U.S. PATENT DOCUMENTS

| | | | |
|---|---|---|---|
| 1,751,424 | 3/1930 | Rosenthal | 310/58 |
| 2,225,398 | 12/1940 | Hamblin | 310/57 |
| 2,294,586 | 9/1942 | Troller | 310/63 |
| 2,397,171 | 3/1946 | Troller | 310/60 |
| 2,615,937 | 10/1952 | Ludwig | 310/63 |
| 2,661,146 | 12/1953 | Hill | 310/58 |
| 3,175,109 | 3/1965 | Stone | 310/62 |
| 3,229,896 | 1/1966 | Levy | 310/63 |
| 3,969,043 | 7/1976 | Bright | 310/63 |

FOREIGN PATENT DOCUMENTS

1,411,987  10/1975  United Kingdom .................... 310/62

Primary Examiner—R. Skudy
Attorney, Agent, or Firm—Browdy and Neimark

[57] ABSTRACT

A device exhausting heated air generated by a heat source in a forklift truck, particularly a device discharging or exhausting heated air generated by an electromotor powered with batteries, which motor is placed in an almost covered space in a forklift, in order to get a cooling effect of the motor as well as the covered space, by utilizing an air exhaust fan which is provided in the motor and by providing an air exhaust duct covering the fan and an air exhausting opening in the wall of the covered space.

6 Claims, 5 Drawing Figures

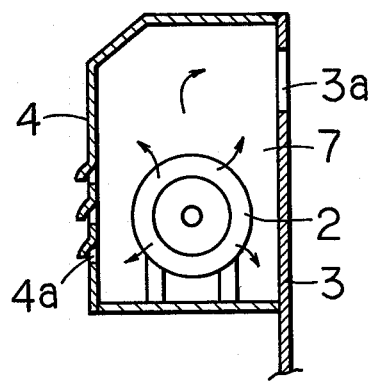
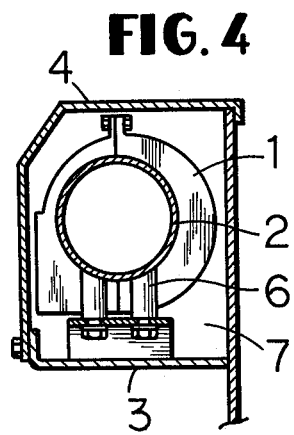
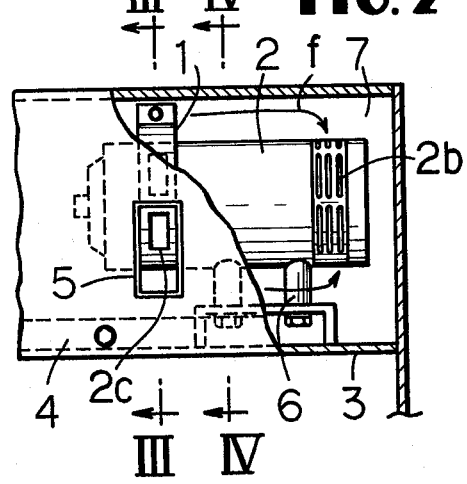
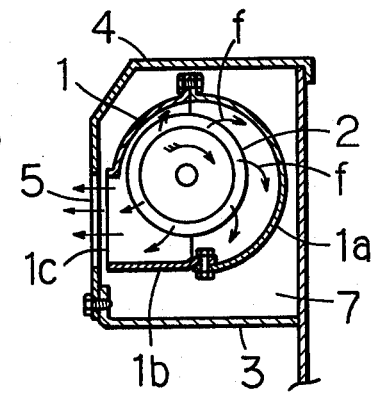
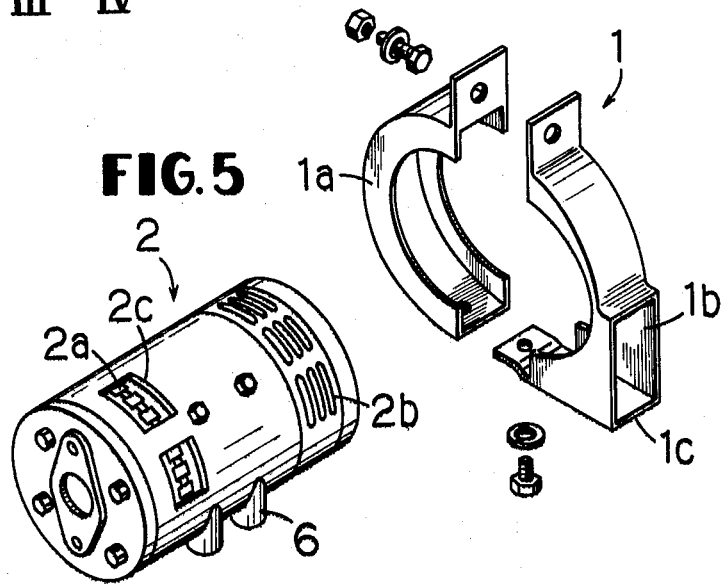

HEATED AIR DISSIPATING DEVICE FOR MOTOR USE IN A BATTERY-POWERED FORKLIFT TRUCK

BACKGROUND OF THE INVENTION

The present invention relates to a device discharging or exhausting heated air generated by an electromotor or motors (hereinafter simply referred to as a motor), powered with a battery or batteries, for use in a forklift truck.

More particularly it relates to a device speedily discharging heated air, generated or produced by a motor placed in an almost completely covered space, by utilizing a cooling fan which is provided with in the motor and avails itself as a ventilator of the covered or closed space.

A battery-powered forklift truck is generally provided with a pair of motors, one is for propelling the main body of the forklift truck (hereinafter simply referred to as a body) and the other is for driving the hydraulic pump, both of which motors are strictly limited with respect to the space available for the location thereof. The motors are (hereinafter a singular form instead of plural form will be used for the convenience sake) often required to be placed in a relatively closed and poorly-ventilated place; it is not necessarily possible to place the motor in a well-ventilated open space. When the motor is placed on the upper portion of the body, as is sometimes observed, it is usually obliged to be hooded or covered for the sake of good appearance. Moreover the motor is sometimes subject to be placed together with heat-sensitive parts, which preferably should be placed in a cool place.

An electric motor is generally a heat-generating apparatus, to a certain extent, so it is often provided with a cooling fan to keep it cool or an exhaust fan to discharge heated air therefrom. When the motor is disposed in a closed space, consequently, the heated air emitted from the motor will be accumulated in the space not only to affect heat-sensitive regulating apparatus or the like placed in the same space but also to overheat the motor itself. This is the reason why openings for ventilation have been conventionally provided to otherwise closed space within which a motor for a forklift is positioned.

It can hardly be expected that a forklift truck is naturally ventilated by wind or moving air, as the traveling speed thereof is normally low and a forklift truck is frequently subject to indoor operation; only natural draught or convectional ventilation can be expected at the best. While a motor for the hydraulic pump is working this tendency is particularly noticeable, because the forklift truck is in a stationary state in such a situation. In conventional battery-powered forklifts undesirable effects from heat from the motor and/or overheating of the motor itself actually frequently occur.

SUMMARY OF THE INVENTION

It is an object of the present invention to provide a solution of the abovementioned problems.

The foregoing object of this invention is achieved by a device, for use in a battery-powered forklift, discharging heated air emitted from a motor out from a closed space, wherein the motor is placed, into the atmosphere, by providing an air exhaust duct of simple structure around an air exhaust fan of the motor and making an opening on a wall covering or defining the closed space, which opening is confronting to the air exhaust duct, in order to get a good cooling effect for the motor as well as the closed space.

DESCRIPTION OF THE DRAWINGS

FIG. 1 is a vertical sectional-view of a conventionally constructed closed-space for accommodating a motor;

FIG. 2 is an elevational view of an embodiment of this invention with a part thereof being broken away;

FIG. 3 is a sectional view taken along the line III — III of FIG. 2;

FIG. 4 is a sectional view taken along the line IV — IV of FIG. 2; and

FIG. 5 is an exploded perspective view of the device shown in FIG. 2.

DETAILED DESCRIPTION OF THE PREFERRED EMBODIMENT

Before turning to the illustrated embodiment shown in FIGS. 2 to 5, a brief reference is made to the conventionally constructed forklift truck motor arrangement of FIG. 1. As shown in FIG. 1, an electric motor 2 of a forklift truck is positioned in a substantially closed space 7 defined by a frame 3 of a forklift truck and a hood or cover 4. The cover 4 is provided with openings 4a and the frame 3 is provided with at least one opening 3a for ventilation purposes. With reference FIGS. 2 to 5 a preferred embodiment of this invention is described with respect to the structure and function thereof.

Structure:

The reference numeral 1 denotes an exhaust duct which is composed of an air collector body or a hood 1a and an air exhaust passage 1b. The exhaust duct 1 as best seen in FIG. 5 can be disassembled into two at approximately the middle thereof by simply unscrewing two nuts from respective bolts. The motor 2 is provided with an exhaust fan 2a which discharges the air sucked in suction openings 2b out of an air discharging openings 2c, both inlet and outlet openings being disposed on the outer shell of the electric motor 2, longitudinally apart with each other, as seen in FIG. 5. The reference numeral 3 denotes a fame of the fork lift truck body, the numeral 4 a cover fixed on the frame 3; both the frame 3 and the cover 4, as walls, define or form a closed space 7 wherein the motor 2 is installed. The motor 2 is secured to the frame 3 by means of mounting seats 6; the exhaust duct 1 is so disposed as to perfectly cover the air discharging openings 2c. An air exhaust opening 1c provided at the end of the air exhaust passage 1b is adjacently confronting with or covering a heated-air-exhausting opening 5 which is formed on the cover 4.

Function:

While the motor 2 is energized, heat is generated within it, however, the heated air is discharged through the air discharging openings 2c, because the air exhaust fan 2a is concurrently rotated. In this instance the heated air is not discharged into the closed space 7, as is the case with the conventional devices, but is discharged into the air collector body 1a of the air-exhaust duct 1, which air is led, successively through the air-exhaust passages 1b, the air-exhaust opening 1c, and the heated-air-exhausting opening 5, out into the open atmosphere.

As a result of functioning of this air exhaust system, the heat emitted from the motor 2 is not accumulated in the closed space 7, as it used to be in the conventional devices, that is the primary effect of this invention.

In this invention another remarkable effect can be observed; that is, the motor 2 concurrently functions as a ventilator for the closed space 7, because the motor is installed therein and the device is so constructed as to compulsorily discharge the exhaust air from the air-exhaust fan 2a out into the atmosphere. The motor 2 sucks air from the closed space 7 through the air suction opening 2b while it exhausts the heated air at the air discharging openings 2c, which results in flowing in of the same quantity fresh air from the atmosphere into the closed space 7. When there is a clearance or an opening for inletting fresh air between the frame 3 and the cover 4 at the overlapping portion thereof, the necessary amount of air naturally flows in; when it is needed, such as when the clearance is not large enough or it is purposely closed or non-existent, an air suction or inlet opening, such as the opening 3a (FIG. 1), or openings shall be made intentionally at preferable positions. In any way an air stream or flow, particularly a stream of fresh air from outside, is created in the closed space 7, which makes the space 7, contrary to such space in conventional forklift trucks, a most desirable place for the heat-sensitive and/or heat generating parts to be accommodated. This effect is especially conspicuous when the forklift trucks are employed in the sun, especially in the tropical geographic areas.

The cooling effect of the motor 2 itself, installing it in the closed space 7 in accordance with this embodiment shows a better result than installing it in an open space, which seems to be attributable to the fact that the cooling effect from the outside thereof is often better in the closed space than in the open space, while there is little difference, regarding the cooling within the motor 2, between the two instances. This is because the cooling of the external surface of the motor 2 is expedited by the air flow caused by the rotation of the same, for this purpose, however, the height of the duct or the thickness of the duct in the longitudinal direction of the electromotor should be determined as small as possible, so far as the duct can cover the discharging opening 2c of the electric motor. In order to positively utilize this cooling phenomenon, all that have to be done is to form an air suction opening to the left of the motor 2, for example, in FIG. 2. The air flows in the direction of arrows f shown in the Figure to increase the cooling effect at the external surface of the motor 2. Although the air exhaust duct 1 of the illustrated embodiment is constructed so it can be disassembled into two parts for the convenience of repairing the motor 2, a single piece, integral duct is of course permissible.

The location of the opening to exhaust the heated air is not necessarily restricted in the cover 4, nor is the number thereof is limited to one; at least one opening in a wall forming the external wall of the closed space is a requisite.

Summing up the effects of this invention, (1) a serious problem that has been accompanying the battery-powered forklifts, the superheat of the motor, has been perfectly dissolved with an excellent effect only by disposing an air exhaust duct and an opening in the external wall of the closed space, and (2) the closed space for installing the motor which has been thought to be a most unfavorable place for accommodating heatphobe parts has been ingeniously changed to a most preferable place for accommodating the same by suitably utilizing the motor as a ventilator for the same space.

It will be obvious to those skilled in the art that various changes may be made without departing from the scope of the invention and the invention is not to be considered limited to what is shown in the drawings and described in the specification.

What is claimed is:

1. A heated air dissipating device for an electric motor having a housing in the form of an outer shell and used to power a hydraulic pump in a battery-powered forklift truck, the device comprising:

an air exhaust fan forming part of said motor, at least one suction inlet opening in said housing for sucking air to cool said motor, and at least one exhaust opening in said housing for discharging air, said inlet and outlet openings being disposed longitudinally apart from each other in said outer shell and said fan being within said outer shell;

an enclosure defined by walls composed of a frame portion of the body of said forklift truck, and a cover portion therefor, for accommodating said electric motor therein, said motor being positioned substantially in parallel with one of said walls in its longitudinal direction and to one side in said enclosure;

an air exhaust duct which covers over and is spaced from said at least one outlet opening, said exhaust duct having an air exhausting opening in a portion thereof;

a heated air exhausting opening disposed in one of said walls defining said enclosure at a position confronting said air exhausting opening of said air exhaust duct for outletting hot air therefrom; and at least one air inlet opening provided in a portion of at least one of said walls for inletting cool and fresh air from the atmosphere ambient into said enclosure.

2. A heated air dissipating device in accordance with claim 1, wherein said at least one air inlet opening is provided in a portion of one of said walls remote from said suction inlet opening in said outer shell of said electric motor.

3. A heated air dissipating device in accordance with claim 2 wherein said enclosure is provided with a space for accommodating heat sensitive members.

4. A heated air dissipating device in accordance with claim 1, wherein said enclosure is ventilated and cooled by air current, caused by said air exhaust fan, flowing longitudinally along said outer shell of said electric motor whenever said motor is energized.

5. A heated air dissipating device in accordance with claim 1, wherein said air exhaust duct is constructed as two parts which can be disassembled.

6. A heated air dissipating device in accordance with claim 1, wherein said air exhaust duct has a width in the longitudinal direction of said motor which is small relative to the longitudinal extent of the motor and extends said at least one exhaust opening in said outer shell of said electric motor.

* * * * *